(12) United States Patent
Tsai

(10) Patent No.: US 9,873,161 B2
(45) Date of Patent: Jan. 23, 2018

(54) ILLUMINATION DEVICE FOR USE WITH GAS COMBUSTOR

(71) Applicant: Chin-Lin Tsai, New Taipei (TW)

(72) Inventor: Chin-Lin Tsai, New Taipei (TW)

( * ) Notice: Subject to any disclaimer, the term of this patent is extended or adjusted under 35 U.S.C. 154(b) by 417 days.

(21) Appl. No.: 14/708,485

(22) Filed: May 11, 2015

(65) Prior Publication Data

US 2016/0121417 A1 May 5, 2016

(30) Foreign Application Priority Data

Oct. 31, 2014 (TW) .............................. 103219407 U

(51) Int. Cl.
| | | |
|---|---|---|
| *B23K 3/08* | (2006.01) |
| *F21S 9/02* | (2006.01) |
| *F21V 33/00* | (2006.01) |
| *F21V 21/088* | (2006.01) |
| *F21V 21/29* | (2006.01) |
| *F21V 21/30* | (2006.01) |
| *F21Y 115/10* | (2016.01) |

(52) U.S. Cl.
CPC ............... *B23K 3/08* (2013.01); *F21S 9/02* (2013.01); *F21V 21/0885* (2013.01); *F21V 21/29* (2013.01); *F21V 21/30* (2013.01); *F21V 33/0084* (2013.01); *F21Y 2115/10* (2016.08)

(58) Field of Classification Search
CPC .................................. B23K 3/08; B25B 23/18

USPC .......... 126/235; 362/119, 190, 98, 197, 198, 362/199, 396
See application file for complete search history.

(56) References Cited

U.S. PATENT DOCUMENTS

| 2,252,267 A | * | 8/1941 | Lofgren | .................... | F16N 3/12 |
| | | | | | 184/1.5 |
| D526,079 S | * | 8/2006 | Heun | ...................... | G09F 17/00 |
| | | | | | D26/60 |
| 7,175,318 B2 | * | 2/2007 | Booty, Jr. | ............... | F21V 15/01 |
| | | | | | 362/199 |
| 2002/0105797 A1 | * | 8/2002 | Navid | ..................... | B25B 23/18 |
| | | | | | 362/120 |
| 2002/0159253 A1 | * | 10/2002 | Dalebout | ................ | G09F 17/00 |
| | | | | | 362/186 |

\* cited by examiner

*Primary Examiner* — Avinash Savani
(74) *Attorney, Agent, or Firm* — Guice Patents PLLC

(57) ABSTRACT

An illumination device for use with gas combustor, which includes an engage ring and at least one lamp. The outer circumference of the engage ring is formed with at least one pivotal seat, and the outer circumference of each of the at least one lamps is formed with a spherical shaft having the inclined angle being adjustable and pivotally connected in the pivotal seat. The illumination device is able to be rapidly connected to a conventional gas combustor, when the above two are combined as one piece, a light source of each of the at least one lamps can be turned on through adjusting the inclined angle of each of the at least one lamps relative to the engage ring, so the generated lights can be projected to the combusting location of the gas combustor to provide required illumination during the combustion operation.

10 Claims, 6 Drawing Sheets

ILLUMINATION DEVICE FOR USE WITH GAS COMBUSTOR

BACKGROUND OF THE INVENTION

1. Field of the Invention

The present invention relates to an illumination device, especially to an illumination device for use with gas combustor

2. Description of Related Art

A conventional gas combustor such as a gas soldering iron or a gas heating torch is mostly used for combustion operations such as welding or soldering. Take the gas soldering iron for example, because gas is used as the fuel, the gas soldering iron can replace an electric soldering iron when electric power is not available, so an advantage of flexible operation is provided.

As a matter of fact, when the above-mentioned gas combustor is used for welding or soldering operation, a lamp is required as an illumination source, so the incorrect welding or soldering happened in a dark environment can be avoided. As such, the skilled people in the art would place a light source, such as a desktop lamp or a working lamp, on a work table for providing proper illumination when an object is being welded or soldered. Because the above-mentioned light source can only provide a large scale illumination, and the shadow formed when an operator is holding the gas combustor may shield the desired welding or soldering location, thus the welding or soldering operation may be affected.

As such, developing an illumination device which can be directly installed on the above-mentioned gas combustor and lights generated by the illumination device can be directly projected to the location where the welding or soldering operation is processed shall be concerned by the skilled people in the art.

SUMMARY OF THE INVENTION

One primary objective of the present invention is to provide an illumination device, which is able to be rapidly combined with a gas combustor, and through adjusting the projecting angle, lights generated by at least one lamp installed on the illumination device is able to be used for directly illuminating the location where a welding or soldering operation is processed, so possible incorrect operations can be avoided.

For achieving said objective, one technical solution provided by the present invention is to provide an illumination device for use with gas combustor, which includes: an engage ring, the inner circumference thereof is formed with an engage port allowing a gas combustor to be engaged, and the outer circumference thereof is installed with at least one pivotal seat; and at least one lamp, each of the at least one lamp includes a housing, the outer circumference thereof is radially installed with a spherical shaft having the inclined angle being adjustable and pivotally connected in the pivotal seat, and the outer circumference thereof is formed with a slot allowing a switch unit to be disposed therein; a base disposed in the housing and including a chamber for accommodating at least one battery and a positioning slot for positioning a light source, and the at least one battery is electrically connected to the light source through the switch unit; and an end cover disposed in an opening of the housing and including a through hole for accommodating the light source and allowing the generated lights to be projected out.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Referring from FIG. 1 to FIG. 4, the present invention provides an illumination device, which includes an engage ring 1 and at least one lamp 2.

Figure 1:
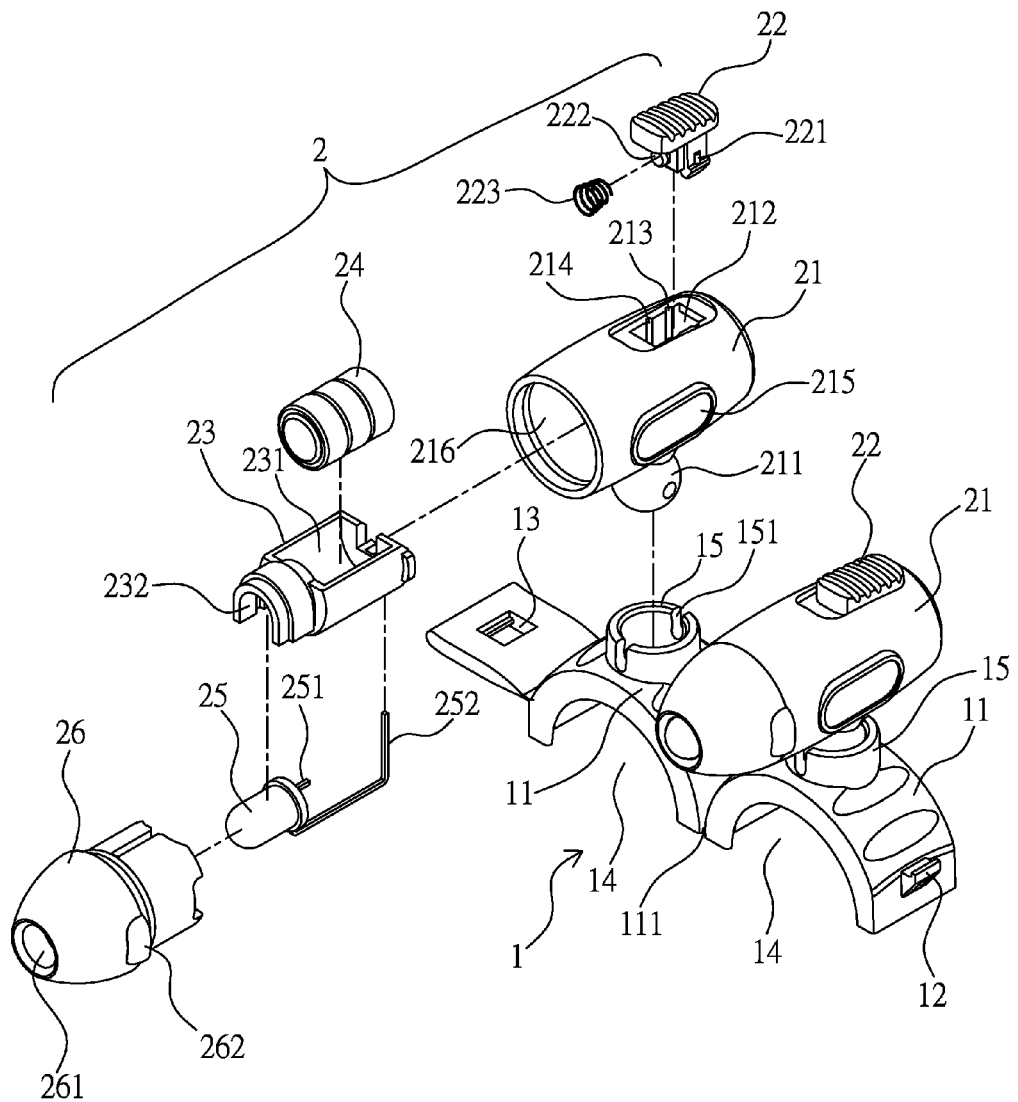
FIG. 1 is perspective exploded view illustrating the illumination device according to the present invention.
Figure 2:
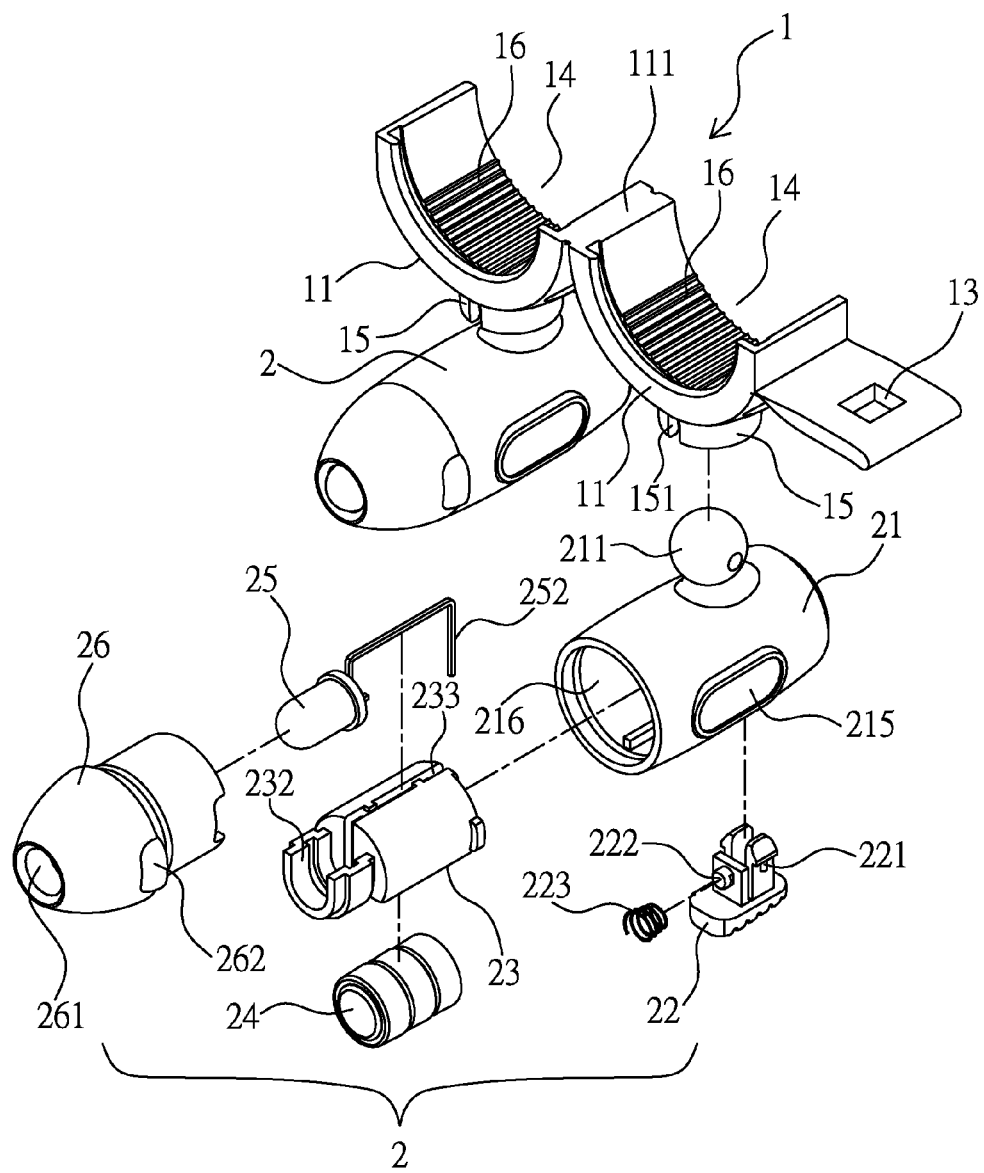
FIG. 2 is perspective exploded view illustrating the illumination device taken from another angle according to the present invention.

As shown in FIG. 1 and FIG. 2, the engage ring 1 includes two semi-circular pieces 11, inner ends of the two semi-circular pieces 11 are connected by a connection piece 111, and outer ends (defined as free ends) of the two semi-circular pieces 11 are correspondingly formed with a buckle hook 12 and a buckle slot 13, so the engage ring 1 can be assembled when the buckle hook 12 is buckled in the buckle slot 13. The inner circumference of the engage ring 1 is formed with an engage port 14 allowing a conventional gas combustor to be engaged, and the outer circumference thereof is formed with at least one pivotal seat 15. As shown in figures, the two semi-circular pieces 11 of the engage ring 1 are respectively formed with one pivotal seat 15 for being respectively connected to one lamp 2.

Wherein, for preventing a rotating motion from being generated after the engage port 14 being engaged with the gas combustor, the engage ring 1 is axially formed with a plurality of positioning slots 16 arranged in parallel at the locations e.g. but not limited to the inner circumferences of the two semi-circular pieces 11. In addition, the periphery of an opening of each of the pivotal seats 15 is formed with at least two grooves 151, thereby allowing each of the pivotal seats 15 to be provided with a radial expanding elasticity.

The quantity of the lamp 2 is corresponding to the quantity of the pivotal seat 15, and each of the lamps 2 includes a housing 21, the outer circumference of the housing 21 is installed with a spherical shaft 211 so as to be rotatably connected in each of the pivotal seats 15. For preventing the spherical shaft 211 from being released from the pivotal seat 15, the depth of the pivotal seat 15 is greater than the radius of the spherical shaft 211, so the spherical shaft 211 is enabled to be rotatably connected in the pivotal seat 15.

In addition, the outer circumference of the housing 21 is radially formed with a slot 212, opposite sides (such as left and right sides) of the slot 212 are respectively formed with a pair of first positioning slots 213 and a pair of second positioning slots 214. A switch unit 22 is disposed in the slot 212, and opposite sides (such as left and right sides) of the switch unit 22 are formed with a pair of positioning tenons 221, so when the switch unit 22 is pushed, the pair of positioning tenons 221 is able to be selectively positioned in the pair of first positioning slots 213 or the pair of second positioning slots 214 in the slot 212. Moreover, the switch unit 22 is axially connected to an elastic member 223, for example a conical spring, for the purpose of controlling the power supply. Wherein, the switch unit 22 has an axially protruding tenon 222 for being sleeved in the elastic member 223. Furthermore, the outer circumference of the housing 21 is radially installed with a handgrip part 215, so when the handgrip part 215 is held, the inclined angle of the housing 21 relative to the engage ring 1 is able to be adjusted.

Each of the lamps 2 further includes a base 23 disposed in the housing 21, and the base 23 includes a chamber 231 allowing at least one battery 24 (for example a mercury battery) to be accommodated and a positioning slot 232 allowing a light source 25 (for example a light emitting diode) to be positioned, the at least one battery 24 is electrically connected to the light source 25 through the switch unit 22. In other words, the light source 25 includes a first pin 251 and a second pin 252, for example the battery 24 is composed of three units being connected in series, and the first pin 251 of the light source 25 is in direct contact with one electrode of the batteries 24, and the second pin 252 is received in a pin slot 233 preformed at the outer circumference of the base 23 and vertically arranged at the rear side of the base 23.

The base 23 is disposed in from a front opening 216 of the housing 21 so as to be positioned, and a gap is formed between the second pin 252 and the switch unit 22 (or the elastic member 223), in other words the second pin 252 is not in contact with the other electrode of the batteries 24 thereby forming a power breaking status. Lastly, an end cover 26 is disposed in the front opening 216 of the housing 21, so the light source 25 is able to be accommodated in a through hole 261 preformed at the front end of the end cover 26. Wherein, the outer circumference of the end cover 26 is formed with a pair of cover tenons 262, so when the end cover 26 is held by fingers, the end cover 26 can easily be combined or detached from the housing 21 for the purpose of replacing the battery 24 which has run out electric power.

Figure 3:
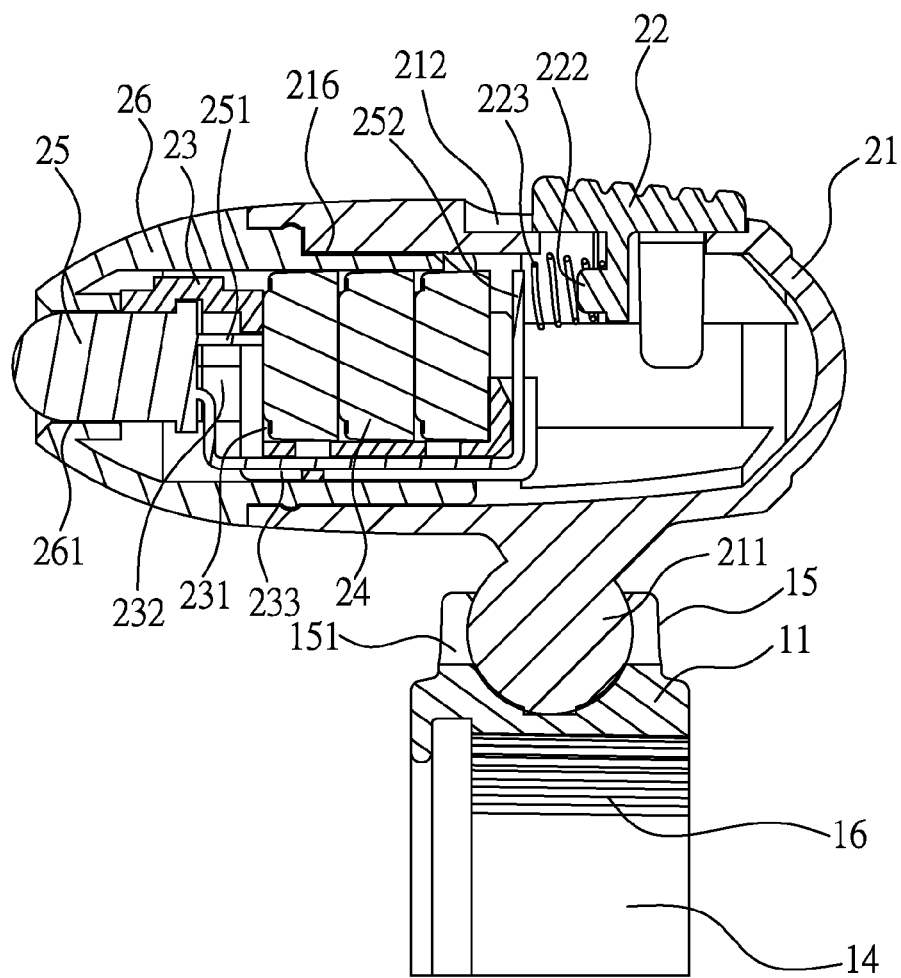
FIG. 3 is a cross sectional view illustrating the lamp of the illumination device being in a turned off status according to the present invention.

As shown in FIG. 3, the pivotal seat 15 of the engage ring 1 allows the spherical shaft 211 of the lamp 2 to be pivotally connected, so the inclined angle of the lamp 2 relative to the engage ring 1 is able to be adjusted. The first pin 251 of the light source 25 is able to be in direct contact with one electrode of the battery 24, and the second pin 252 is vertically arranged at the rear side of the base 23, and a gap is formed between the second pin 252 and the elastic member 223 of the switch unit 22, thereby forming the power breaking status.

Figure 4:
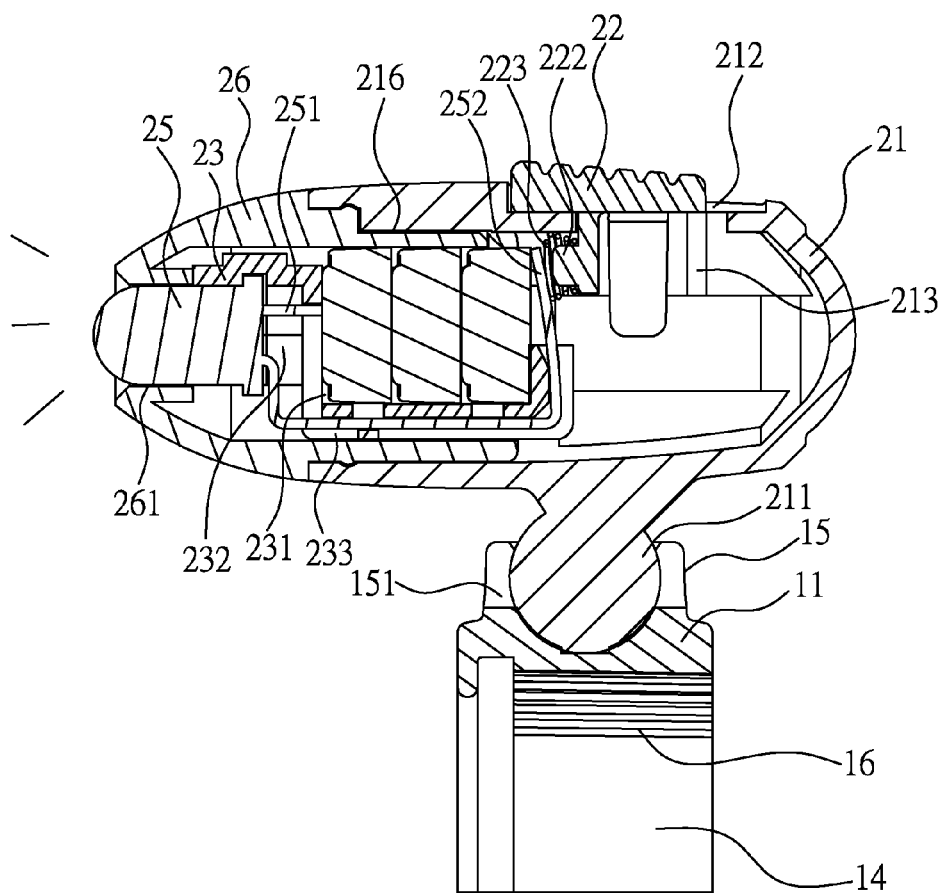
FIG. 4 is a cross sectional view illustrating the lamp of the illumination device being in a turned on status according to the present invention.

As shown in FIG. 4, if the light source 25 is desired to be turned on, the user only needs to use his/her fingers to push the switch unit 22 for allowing the switch unit 22 to be moved from a first position (as shown in FIG. 3) to a second position (as shown in FIG. 4), and the elastic member 223 is enabled to push the second pin 252 to be in contact with the other electrode of the battery 24, thereby forming an electrically connecting status, so the light source 25 is able to be turned on and the generated lights can pass the through hole 261 of the end cover 26 so as to be projected to the exterior for the purpose of providing illumination.

As a matter of fact, the sliding type operation of the switch unit 22 and the base 23 of the lamp 2 disclosed in this embodiment only serves as an example, other type of operations can also be adopted, in other words other type of operations for turning on the light source such as pressing type and touch controlling type are within the scope of the present invention.

Figure 5:
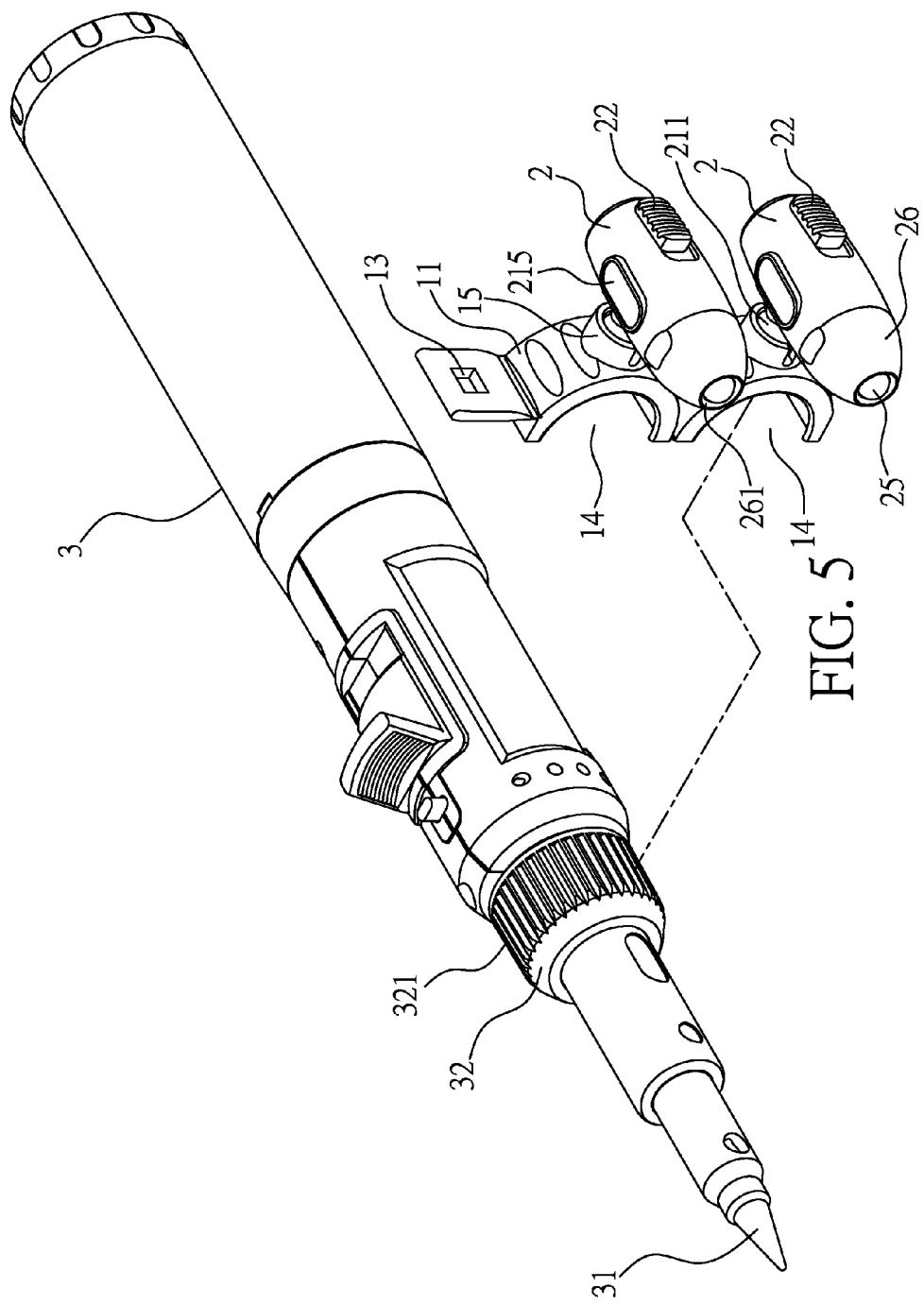
FIG. 5 is a perspective exploded view illustrating the illumination device and a gas combustor according to the present invention.
Figure 6:
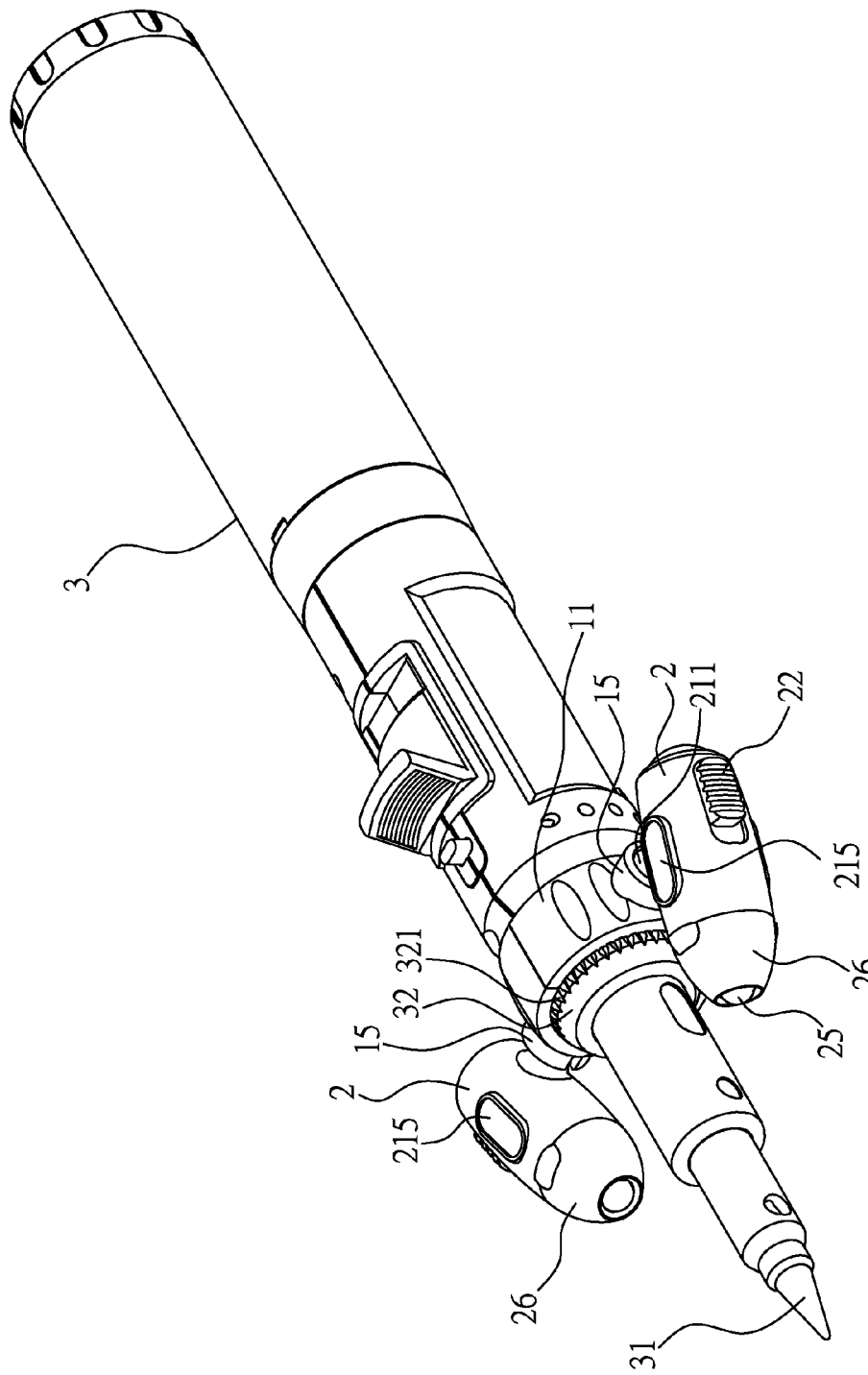
FIG. 6 is a perspective view illustrating the illumination device being combined with the gas combustor according to the present invention.

Referring to FIG. 5, which is a perspective exploded view illustrating the illumination device and a gas combustor 3, for example a gas soldering iron, according to the present invention; the front end of the gas soldering iron 3 is installed with a soldering head 31, and the approximate central position is formed with a connection ring 32, the outer circumference of the connection ring 32 is formed with a plurality of ribs 321 arranged in parallel. In addition, the two semi-circular pieces 11 of the engage ring 1 are respectively engaged with the connection ring 32, then the buckle hook 12 and the buckle slot 13 at the outer ends of the two semi-circular pieces 11 are mutually buckled, so the engage port 14 formed through engaging the two semi-circular pieces 11 is able to be engaged with the connection ring 32, and the ribs 321 at the outer circumference of the connection ring 32 are inserted in the positioning slots 16 at the inner circumference of the two semi-circular pieces 11, thereby preventing the connection ring 32 from being rotated relative to the engage ring 1. Lastly, the inclined angle of each of the lamps 2 relative to the engage ring 1 is adjusted, so the spherical shaft 211 of each of the lamps 2 is enabled to be rotated in the corresponding pivotal seat 15 of the engage ring 1, thereby enabling each of the lamps 2 (as shown in FIG. 6) to orient the light source 25 towards the soldering head 31.

When in use, the switch unit 22 of each of the lamps 2 is operated, so the light source 25 and the at least one battery 24 in each of the lamps 2 are electrically connected so as to turn on the light source 25, the generated lights are able to pass the end cover 26 and projected towards the soldering head 31, thereby providing the illumination required during the soldering operation.

Based on what has been disclosed above, advantages achieved by the present invention are as followings: the illumination device is able to be rapidly connected to the conventional gas combustor, when the above two are combined as one piece, the light source of each of the lamps can be turned on through adjusting the inclined angle of each of the lamps relative to the engage ring, so the generated lights can be projected to the combusting location of the gas combustor so as to provide the illumination required when the combustion operation is processed. Accordingly, the illumination device for use with gas combustor provide by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An illumination device for use with gas combustor, including:
   an engage ring, wherein the inner circumference thereof is formed with an engage port allowing a gas combustor to be engaged, and the outer circumference thereof is installed with at least one pivotal seat; and
   at least one lamp, wherein each of said at least one lamp includes a housing, the outer circumference thereof being radially installed with a spherical shaft having the inclined angle being adjustable and pivotally connected in said pivotal seat, and the outer circumference thereof being formed with a slot allowing a switch unit to be disposed therein; a base disposed in said housing and including a chamber for accommodating at least one battery and a positioning slot for positioning a light source, and said at least one battery being electrically connected to said light source through said switch unit; and an end cover disposed in an opening of said housing and including a through hole for accommodating said light source and allowing the generated lights to be projected out;
   wherein the periphery of an opening of said pivotal seat is formed with at least two grooves, and the depth of said pivotal seat is greater than the radius of said spherical shaft.

2. The illumination device for use with gas combustor as claimed in claim 1, wherein said engage ring includes two semi-circular pieces, inner ends of said two semi-circular pieces are connected by a connection piece, and outer ends thereof are correspondingly formed with a buckle hook and a buckle slot capable of being mutually buckled, so the inner circumference of said engage ring is formed with said engage port when said buckle hook is buckled in said buckle slot.

3. The illumination device for use with gas combustor as claimed in claim 2, wherein inner circumferences of said two semi-circular pieces of said engage ring are axially formed with a plurality of positioning slots arranged in parallel.

4. The illumination device for use with gas combustor as claimed in claim 1, wherein said light source includes a first pin and a second pin, said first pin of said light source is in direct contact with one electrode of said at least one battery, and said second pin is vertically arranged at the rear side of said base, and a gap is formed between said second pin and said switch unit; when said switch unit is operated, said switch unit is moved from a first position to a second position in said slot, and said switch unit is enabled to push said second pin to be in contact with the other electrode of said battery, thereby forming an electrically connecting status for turning on said light source.

5. The illumination device for use with gas combustor as claimed in claim 4, wherein opposite sides of said slot are respectively formed with a pair of first positioning slots and a pair of second positioning slots, opposite sides of said switch unit are formed with a pair of positioning tenons; when said switch unit is pushed, said pair of positioning tenons is able to be selectively positioned in said pair of first positioning slots or said pair of second positioning slots in said slot.

6. The illumination device for use with gas combustor as claimed in claim 4, wherein said switch unit is axially connected to an elastic member.

7. The illumination device for use with gas combustor as claimed in claim 6, wherein said elastic member is a conical spring, and said switch unit has an axially protruding tenon for being sleeved in said spring.

8. The illumination device for use with gas combustor as claimed in claim 4, wherein the outer circumference of said base is formed with a pin slot allowing said second pin to be received.

9. The illumination device for use with gas combustor as claimed in claim 1, wherein the outer circumference of said housing is radially installed with a handgrip part capable of be held, and the outer circumference of said end cover is formed with a pair of cover tenons capable of being held.

10. The illumination device for use with gas combustor as claimed in claim 1, wherein said battery is a mercury battery, and said light source is a light emitting diode.

* * * * *